United States Patent [19]

Hou

[11] Patent Number: 5,509,713
[45] Date of Patent: Apr. 23, 1996

[54] WINDOW SUNSHADE FOR CARS

[76] Inventor: Hsien-Te Hou, No. 5, Lane 279, Chung Cheng Road, Yung Kang Shih, Tainan Hsien, Taiwan

[21] Appl. No.: 328,439

[22] Filed: Oct. 25, 1994

[51] Int. Cl.⁶ ....................................................... B60J 3/00
[52] U.S. Cl. ....................... 296/138; 160/330; 160/370.21
[58] Field of Search ............................. 296/138; 160/330, 160/370.23, 370.21, 341, 327, 354, 368.1, DIG. 2

[56] References Cited

U.S. PATENT DOCUMENTS

| | | | |
|---|---|---|---|
| 2,804,135 | 8/1957 | Sutton | 160/DIG. 2 |
| 4,720,136 | 1/1988 | Higgins | 296/138 |
| 5,109,912 | 5/1992 | Gary | 160/330 |
| 5,205,337 | 4/1993 | Bozzo | 160/330 |
| 5,423,589 | 6/1995 | Pank | 160/370.21 |

FOREIGN PATENT DOCUMENTS

| | | | |
|---|---|---|---|
| 1191619 | 10/1959 | France | 160/330 |
| 1577827 | 8/1969 | France | 160/330 |
| 403231026 | 10/1991 | Japan | 296/138 |
| 1162201 | 8/1969 | United Kingdom | 160/330 |

Primary Examiner—David M. Mitchell
Assistant Examiner—Gary C. Hoge
Attorney, Agent, or Firm—Morton J. Rosenberg; David I. Klein

[57] ABSTRACT

A window sunshade for cars includes an elongate foam rubber band adhered on an inner upper edge of a window frame of either of side windows of a car, and a VELCRO hook strip fixed on an outer side of the foam rubber band to fasten with a VELCRO loop strip on an inner side of vertical portion of a T-shaped cross-sectional position bar made of soft plastic. The position bar has a horizontal portion as a rail for C-shaped hooks to hook and slide thereon. The hooks also hook through holes in an upper end of a sunshade so that the sunshade may be hung on the position bar and secured in a spread position by two outermost hooks hooking with two clasping ends fitting with two ends of the position bar.

2 Claims, 5 Drawing Sheets

WINDOW SUNSHADE FOR CARS

BACKGROUND OF THE INVENTION

This invention concerns a window sunshade for cars, particularly one easily installed on and removed from side windows of a car and easily spread over the window or to be pulled to one side for looking through or opening the window glass.

Nowadays common cars have their windshield and rear windows adhered with heat insulating and sunshading papers, and two side windows installed with sunshades 30 shown in FIG. 6. The sunshade 30 has sucking plates 20 at four corners to be attached on the window glass 10. However, this kind of sunshade may not be able to cover the whole window, as car windows have a wide variety of sizes, and in addition, it has to be attached on the window glass so that the window glass cannot be lowered to open it when necessary. Provided the window glass is to be opened, the sunshade 30 should have to be firstly removed from the glass to enable it to be opened, which is quite inconvenient.

SUMMARY OF THE INVENTION

A window sunshade for cars in the present invention includes an elongate foam rubber band to be adhered on an inner upper edge of a window frame, an elongate VELCRO loop strip fixed on an outer longitudinal side of the foam rubber band, a T-shaped cross-sectional elongate position bar, a VELCRO loop strip adhered on an inner side of the vertical portion of the position bar to fasten with the elongate VELCRO hook strip of the foam rubber band, a sunshade having its upper end provided with a plurality of hook holes, a plurality of C-shaped hooks to fit through the hook holes of the sunshade and to hook and slide on a horizontal portion of the position bar, and two clasping ends fitting with Two ends of the position bar for two outer-most hooks to hook with so as to secure the sunshade immovable in a spread position.

BRIEF DESCRIPTION OF DRAWINGS

The invention will be better understood by reference to the accompanying drawings, wherein.

DESCRIPTION OF PREFERRED EMBODIMENTS

Figures 1, 3:
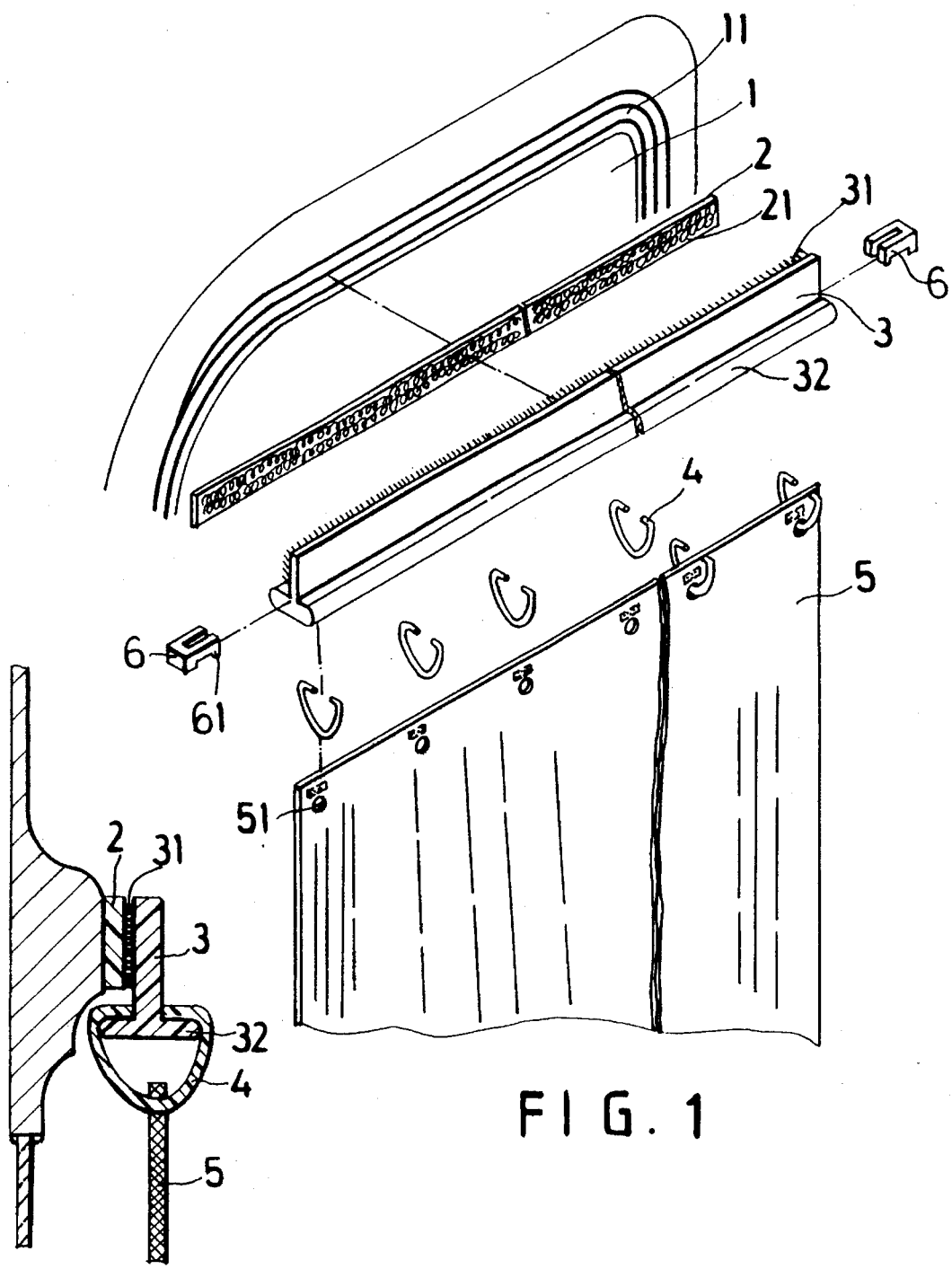
FIG. 1 is an exploded perspective view of a first embodiment of a window sunshade for cars in the present invention.
FIG. 3 is a partial side cross-sectional view of the first embodiment of the window sunshade for cars in the present invention.
Figure 2:
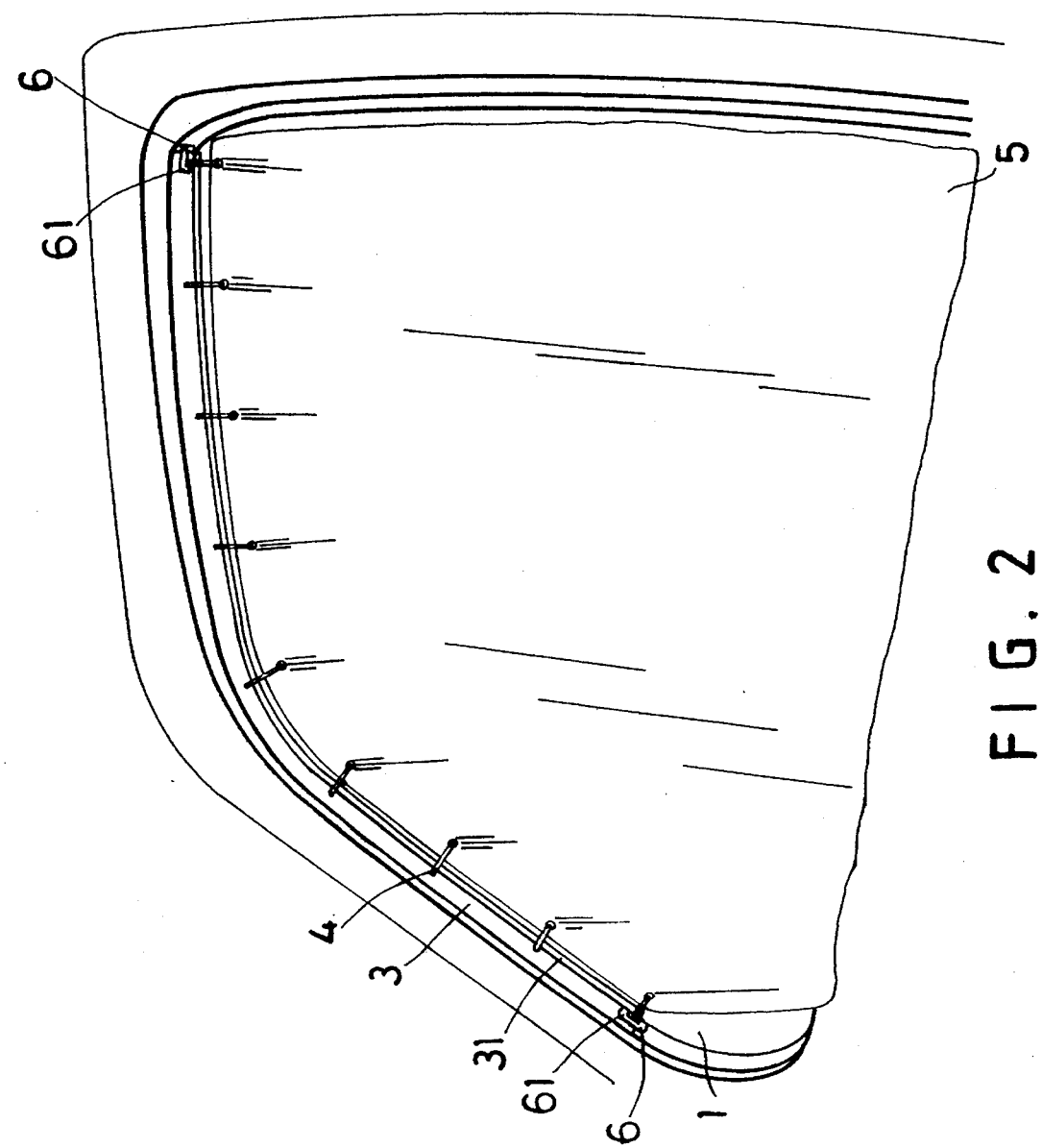
FIG. 2 is a partial perspective view of the first embodiment of the window sunshade for cars in the present invention.
Figure 4:
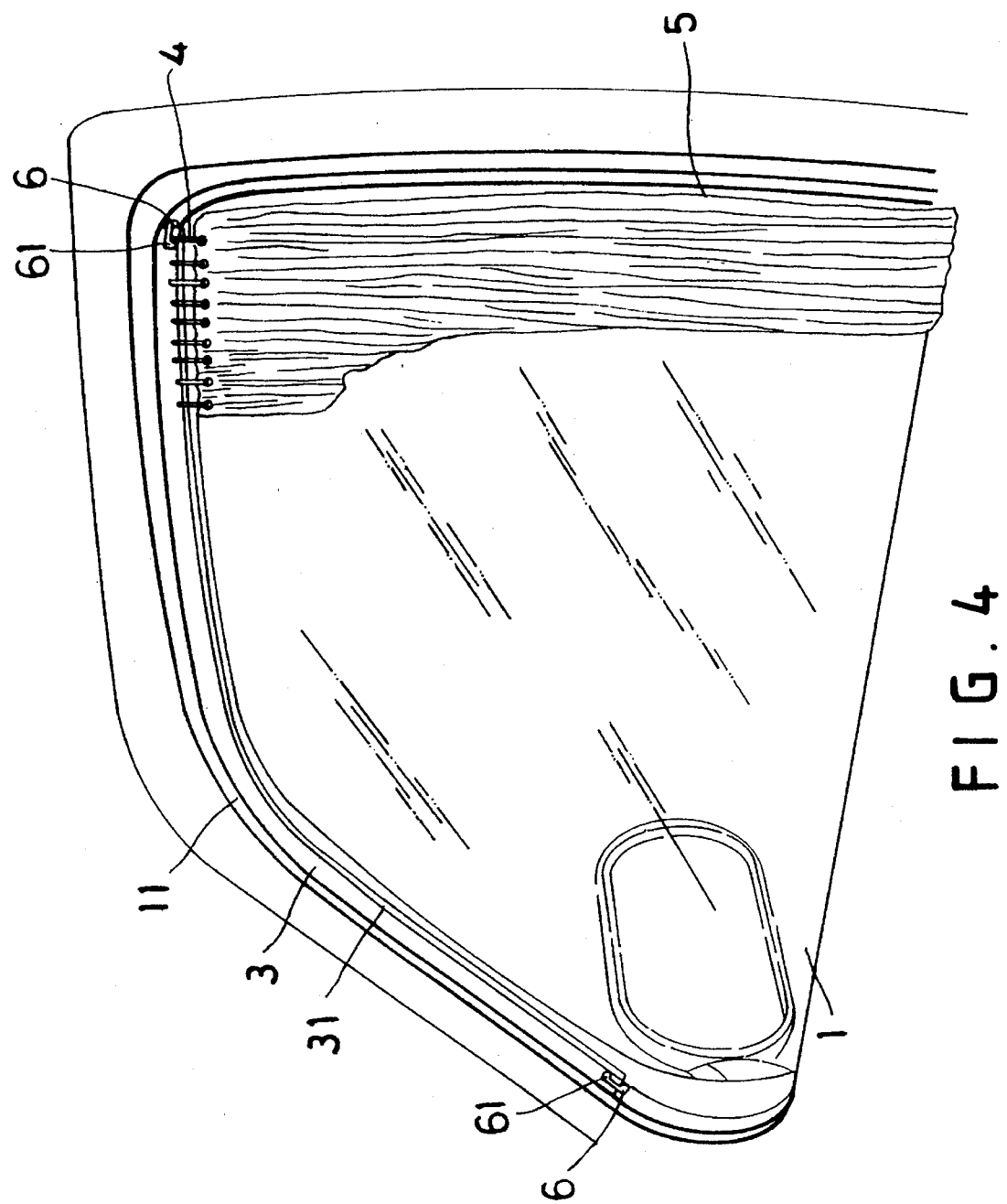
FIG. 4 is a perspective view of the first embodiment of the window sunshade for cars in the invention, showing it pulled to one side.

A first embodiment of a window sunshade for cars in the present invention, as shown in FIGS. 1, 2 and 3, includes an elongate foam rubber band 2 of a preset length To be adhered on an inner upper edge 11 of a window frame of either of two side windows of a car, a VELCRO hook strip 21 fixed on an outer side of the foam rubber band 2, and an elongate position bar 3 made of a soft rubber and having an inverted T-shaped cross-section consisting of a vertical longitudinal portion and a lower, horizontal rail portion 32 formed under the vertical longitudinal portion, a VELCRO loop strip 31 attached to an inner side of the vertical longitudinal portion and a horizontal rail 32 formed under the vertical portion, and a sunshade 5 having larger dimensions than, or the same size as, a window to be shaded thereby, as main components combined together. The VELCRO hook strip 21 is fastened with the VELCRO loop strip 31 to combine the position bar 3 with the foam rubber band 2. A plurality of C-shaped hooks 4 are provided to hook on the rail 32, also hooking through hook holes 51 made in an upper end of the sunshade 5 so as to hang the sunshade 5 on the position bar 3 to shade the window 1. Two U-shaped end fasteners 6 are provided to respectively fit tightly with one end of the position bar 3, having an inner clasping end 61 projecting a little down so that the two outermost hooks 4, 4 may hook with the end fasteners 6 so as to secure the sunshade 5 immovable in a spread position.

If the sunshade 5 is wanted to be pulled open for looking out through the window glass, one of the clasping end 61 is manually pushed up a bit, disengaging the outermost hook 4 from the clasping end 61, and then the sunshade 5 may be pushed to one side, with the other hooks 4 moving along the rail 32.

Provided that the sunshade 5 is needed to be washed, it can be removed off the rail 32 from the U-shaped end fastener 6 at one side, with The hooks 4 sliding along the rail 32.

Figure 5:
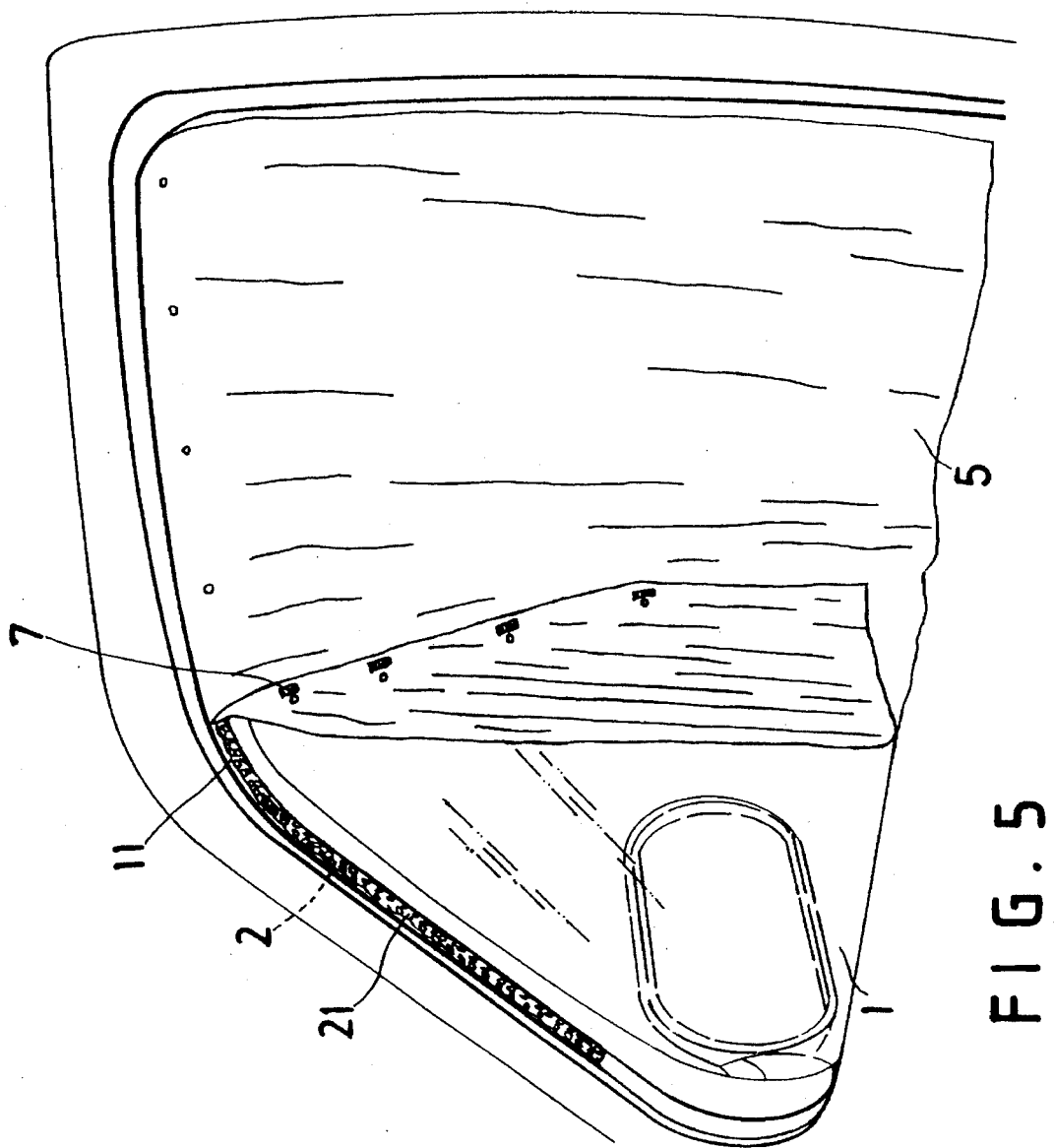
FIG. 5 is a perspective view of a second embodiment of the window sunshade for cars in the present invention; and, FIG. 6 is a perspective view of a known conventional sunshade for cars.
Figure 6:
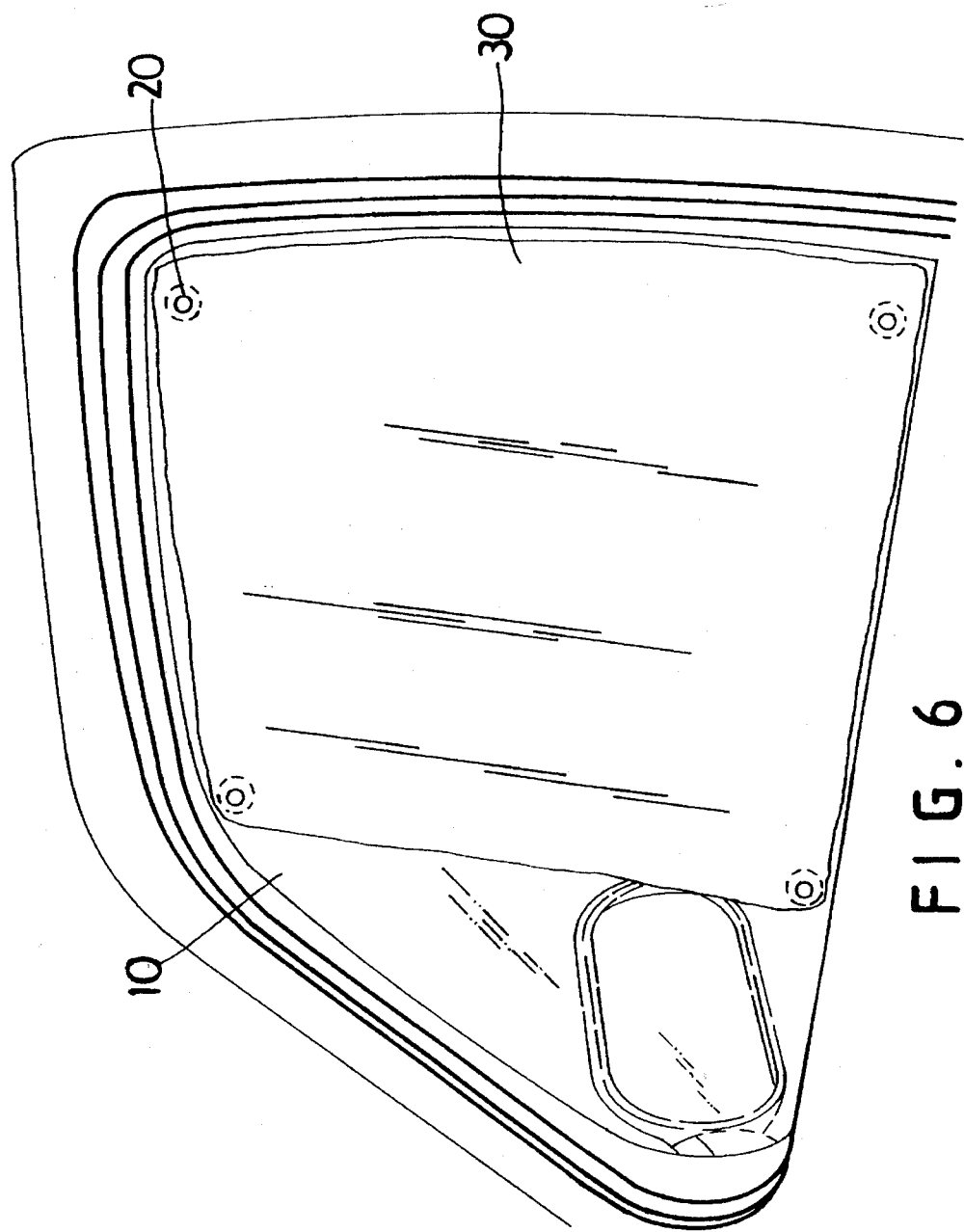

A second embodiment of the window sunshade in the present invention, as shown in FIG. 5, includes a side foam rubber band 2 adhered in advance on an inner upper edge 11 of a window frame of either of side windows of a car, a VELCRO hook strip 21 attached on an outer side of the foam rubber band 2, a sunshade 5 having larger dimensions than a window to be shaded thereby, a plurality of small VELCRO loop pieces 7 sewn on an upper end of the sunshade 5 so that the small pieces 7 may fasten with the VELCRO hook strip 21 and then the sunshade 5 can be hung to shade the window.

If the sunshade 5 is wanted to be pulled off the window for looking out of the window glass, the small VELCRO loop pieces 7 can be pulled to disengage from the VELCRO hook strip 21, freeing the sunshade 5 from the foam rubber band 2, and also for washing if necessary. So it is quite evident that the second embodiment of the window sunshade is very easy to be used both for shading and for being taken off of a side window of a car for washing.

While the preferred embodiments of the invention have been described above, it will be recognized and understood that various modifications may be made therein and the appended claims are intended to cover all such modifications which may fall within the spirit and scope of the invention.

What is claimed is:

1. A window sunshade for a vehicle side window comprising:

an elongate foam rubber band for attachment to an inner, upper edge of a frame of said side window, a VELCRO hook strip adhered on an outer longitudinal side of said foam rubber band, an elongate position bar having an inverted T-shaped cross-section consisting of a vertical longitudinal portion and a lower, horizontal rail portion under said vertical longitudinal portion, a VELCRO loop strip attached to said vertical longitudinal portion for fastening with said VELCRO hook strip of said foam rubber band, a sunshade having larger dimensions than said window to be shaded and a plurality of hook holes in an upper end thereof, a plurality of C-shaped hooks hooking through said hook holes of said sunshade and being slidably mounted on said horizontal rail portion such that the vertical longitudinal portion passes through openings in said C-shaped hooks, and two U-shaped end fasteners frictionally engaging two ends of said position bar, and the two outermost hooks of said C-shaped hooks hooking in said two end fasteners so as to secure said sunshade in a spread position.

2. The window sunshade as claimed in claim 1, wherein said sunshade has a plurality of small VELCRO loop pieces sewn on an upper longitudinal end and spaced apart to fasten with said VELCRO hook strip of said foam rubber band.

* * * * *